US012199350B2

(12) United States Patent
Cao et al.

(10) Patent No.: US 12,199,350 B2
(45) Date of Patent: Jan. 14, 2025

(54) PHASE SHIFTER AND ANTENNA

(71) Applicants: Beijing BOE Sensor Technology Co., Ltd., Beijing (CN); BOE TECHNOLOGY GROUP CO., LTD., Beijing (CN)

(72) Inventors: Di Cao, Beijing (CN); Yan Wang, Beijing (CN); Haocheng Jia, Beijing (CN); Yan Lu, Beijing (CN); Guodong Feng, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/023,984

(22) PCT Filed: Feb. 28, 2022

(86) PCT No.: PCT/CN2022/078472

§ 371 (c)(1),
(2) Date: Feb. 28, 2023

(87) PCT Pub. No.: WO2023/159635

PCT Pub. Date: Aug. 31, 2023

(65) Prior Publication Data

US 2024/0283149 A1 Aug. 22, 2024

(51) Int. Cl.

*H01Q 3/36* (2006.01)
*H01P 1/18* (2006.01)
*H01Q 1/38* (2006.01)

(52) U.S. Cl.

CPC ................ *H01Q 3/36* (2013.01); *H01P 1/18* (2013.01); *H01Q 1/38* (2013.01)

(58) Field of Classification Search

CPC ............... H01Q 3/36; H01Q 1/38; H01P 1/18
See application file for complete search history.

(56) References Cited

U.S. PATENT DOCUMENTS 5,537,242 A * 7/1996 Lim ......................... H01Q 3/36 349/23
7,570,133 B1 8/2009 Taft et al.
(Continued)

FOREIGN PATENT DOCUMENTS

CN 111342173 A 6/2020
CN 111864317 A 10/2020
(Continued)

*Primary Examiner* — Dieu Hien T Duong
(74) *Attorney, Agent, or Firm* — HOUTTEMAN LAW LLC

(57) ABSTRACT

A phase shifter includes a signal line and a reference electrode respectively disposed on sides of different ones or both disposed on a same side of a same one of a first base plate and a second base plate proximal to a dielectric layer, and includes a straight unit and a bent unit along an extending direction of the signal line. The signal line includes a first signal sub-line corresponding to the straight unit and a second signal sub-line corresponding to the bent unit, and the reference electrode includes a first reference sub-electrode corresponding to the straight unit and a second reference sub-electrode corresponding to the bent unit. The second signal sub-line and the second reference sub-electrode which correspond to the bent unit are configured to make an impedance of the bent unit match to an impedance of the straight unit and/or an impedance of another adjacent bent unit.

20 Claims, 7 Drawing Sheets

(56) References Cited

U.S. PATENT DOCUMENTS

| | | | | |
|---|---|---|---|---|
| 2003/0202800 | A1 | 10/2003 | Matsushima et al. | |
| 2009/0315649 | A1* | 12/2009 | Minegishi | H01P 3/026 333/238 |
| 2010/0182107 | A1 | 7/2010 | Margomenos et al. | |
| 2022/0140800 | A1 | 5/2022 | Fang et al. | |

FOREIGN PATENT DOCUMENTS

| | | | |
|---|---|---|---|
| JP | 2003289206 | A | 10/2003 |
| JP | 2010109243 | A | 5/2010 |
| WO | WO2021036921 | A1 | 3/2021 |
| WO | WO2021259142 | A1 | 12/2021 |

* cited by examiner

PHASE SHIFTER AND ANTENNA

CROSS-REFERENCE TO RELATED APPLICATIONS

This is a National Phase Application filed under 35 U.S.C. 371 as a national stage of PCT/CN2022/078472 filed on Feb. 28, 2022, the entire content of which is incorporated herein by reference.

TECHNICAL FIELD

The present disclosure relates to the field of communication technology, and in particular, to a phase shifter and an antenna.

BACKGROUND

A phased array antenna plays an important role in a modern wireless communication system by virtue of excellent characteristics such as rapid beam scanning and the like. A phase shifter is an important component of the phased array antenna, and a structure and a performance of the phase shifter have a direct influence on the performance of the whole phased array antenna. A distance between any two adjacent phased array antennas is required generally to be 0.5λ to 0.6λ, where λ is a vacuum wavelength of a signal corresponding to an operating frequency of the phase shifter. Thus, in order to meet the requirement, an available layout area for each phase shifter is only 0.5λ×0.5λ, and meanwhile, the phase shifter needs to achieve a phase shift angle of 360°. Therefore, a certain bending arrangement of a coplanar waveguide (CPW) transmission line is required.

However, a characteristic impedance of the transmission line in a bent region may not match to an impedance of a phase shifter unit in a straight region adjacent to the bent region, resulting in a large energy loss of the signal and a failure to perform effective signal transmission.

SUMMARY

Some embodiments of the present disclosure provide a phase shifter and an antenna, which can at least achieve impedance matching between a bent unit and a straight unit (or another bent unit) adjacent to the bent unit, so as to achieve effective transmission of a radio frequency signal.

In a first aspect, embodiments of the present disclosure provide a phase shifter, including a first substrate and a second substrate opposite to each other and a dielectric layer between the first substrate and the second substrate, wherein the first substrate includes a first base plate, the second substrate includes a second base plate, a signal line and a reference electrode are respectively disposed on sides of different ones or are both disposed on a same side of a same one of the first base plate and the second base plate proximal to the dielectric layer, and the phase shifter includes a straight unit and a bent unit along an extending direction of the signal line;

the signal line includes a first signal sub-line corresponding to the straight unit and a second signal sub-line corresponding to the bent unit, and the reference electrode includes a first reference sub-electrode corresponding to the straight unit and a second reference sub-electrode corresponding to the bent unit; and the second signal sub-line and the second reference sub-electrode which correspond to the bent unit are configured to make an impedance of the bent unit match to an impedance of the straight unit which is adjacent to the bent unit, and/or an impedance of another bent unit adjacent to the bent unit.

Optionally, the first signal sub-line includes a first signal line main body, which has a straight-line shape, and at least one first branch connected to the first signal line main body, the first reference sub-electrode includes two first electrode main bodies, which respectively have straight-line shapes and are spaced apart from each other on both sides of the first signal line main body, and extending directions of the two first electrode main bodies are both parallel to an extending direction of the first signal line main body;

the second signal sub-line includes a second signal line main body, the second reference sub-electrode includes two second electrode main bodies which are spaced apart from each other on both sides of the second signal line main body, and extending directions of the two second electrode main bodies are both parallel to an extending direction of the second signal line main body; and a line width of the second signal line main body corresponding to the bent unit and a distance between the two second electrode main bodies meet a requirement that the impedance of the bent unit matches to the impedance of the straight unit which is adjacent to the bent unit, and/or the impedance of the another bent unit adjacent to the bent unit.

Optionally, for the bent unit and the straight unit adjacent to the bent unit, a distance between the second signal line main body and each second electrode main body, which correspond to the bent unit, is less than a distance between the first signal line main body and each first electrode main body, which correspond to the straight unit.

Optionally, the distance between the two second electrode main bodies corresponding to the bent unit is the same as a distance between the two first electrode main bodies corresponding to the straight unit adjacent to the bent unit, and the line width of the second signal line main body corresponding to the bent unit is greater than a line width of the first signal line main body corresponding to the straight unit adjacent to the bent unit.

Optionally, a spacing region between one of the two second electrode main bodies which has a larger bending radius and the second signal line main body is a first spacing region, and a spacing region between the other of the two second electrode main bodies which has a smaller bending radius and the second signal line main body is a second spacing region; and at least one of the first spacing region and the second spacing region is provided with at least one second branch, the at least one second branch in a same spacing region is spaced apart from each other along the extending direction of the second signal line main body, and each of the at least one second branch is connected to the second signal line main body and at least one of the two second electrode main bodies.

Optionally, the at least one second branch has a same width, a number of the at least one second branch in the first spacing region is greater than a number of the at least one second branch in the second spacing region.

Optionally, for the bent unit and the straight unit adjacent to the bent unit, a distance between the second signal line main body and each second electrode main body, which correspond to the bent unit, is equal to a distance between the first signal line main body and each first electrode main body, which correspond to the straight unit.

Optionally, the distance between the two second electrode main bodies corresponding to the bent unit is equal to a distance between the two first electrode main bodies corresponding to the straight unit adjacent to the bent unit, and the line width of the second signal line main body corresponding to the bent unit is equal to a line width of the first signal line main body corresponding to the straight unit adjacent to the bent unit.

Optionally, at least one tuning bridge is connected between the two second electrode main bodies corresponding to the bent unit, disposed in a plane different from a plane where the second signal line main body is located, and is spaced apart from each other along the extending direction of the second signal line main body.

Optionally, the signal line and the reference electrode are disposed on the sides of different ones of the first base plate and the second base plate proximal to the dielectric layer, respectively; and the at least one tuning bridge is disposed on the base plate where the reference electrode is disposed, and is disposed on the same surface as the two second electrode main bodies.

Optionally, the signal line and the reference electrode are both disposed on a same side of a same one of the first base plate and the second base plate proximal to the dielectric layer; and each tuning bridge includes two supporting portions and a crossbeam portion, the two supporting portions are arranged on the base plate where the signal line and the reference electrode are both arranged and are respectively connected to the two second electrode main bodies, the crossbeam portion is arranged in a plane different from a plane where the two second electrode main bodies are arranged, and both ends of the crossbeam portion are connected to the two supporting portions, respectively.

Optionally, the signal line and the reference electrode are disposed on the sides of different ones of the first base plate and the second base plate proximal to the dielectric layer, respectively;

the at least one first branch is arranged on the base plate where the signal line is arranged, and connected to the first signal line main body, and an orthogonal projection of each first branch on the first base plate partially overlaps an orthogonal projection of each first electrode main body on the first base plate; and the at least one second branch is arranged on the base plate where the signal line is arranged, and connected to the second signal line main body, and an orthogonal projection of each second branch on the first base plate partially overlaps an orthogonal projection of each second electrode main body on the first base plate.

Optionally, the signal line and the reference electrode are both provided on the side of one of the first base plate and the second base plate proximal to the dielectric layer, a first patch electrode layer corresponding to the straight unit and a second patch electrode layer corresponding to the bent unit are arranged on the side, which is proximal to the dielectric layer, of the other of the first base plate and the second base plate;

the first patch electrode layer includes at least one first patch electrode arranged in one-to-one correspondence with the at least one first branch to form at least one first variable capacitor, and an orthogonal projection of each of the at least one first patch electrode on the first base plate at least partially overlaps an orthogonal projection of a corresponding one of the at least one first branch on the first base plate; and the second patch electrode layer includes at least one second patch electrode arranged in one-to-one correspondence with the at least one second branch to form at least one second variable capacitor, and an orthogonal projection of each of the at least one second patch electrode on the first base plate at least partially overlaps an orthogonal projection of a corresponding one of the at least one second branch on the first base plate.

In a second aspect, embodiments of the present disclosure provide an antenna, which includes any one of the phase shifters provided by the present disclosure.

DETAILED DESCRIPTION OF EMBODIMENTS

Figure 1:
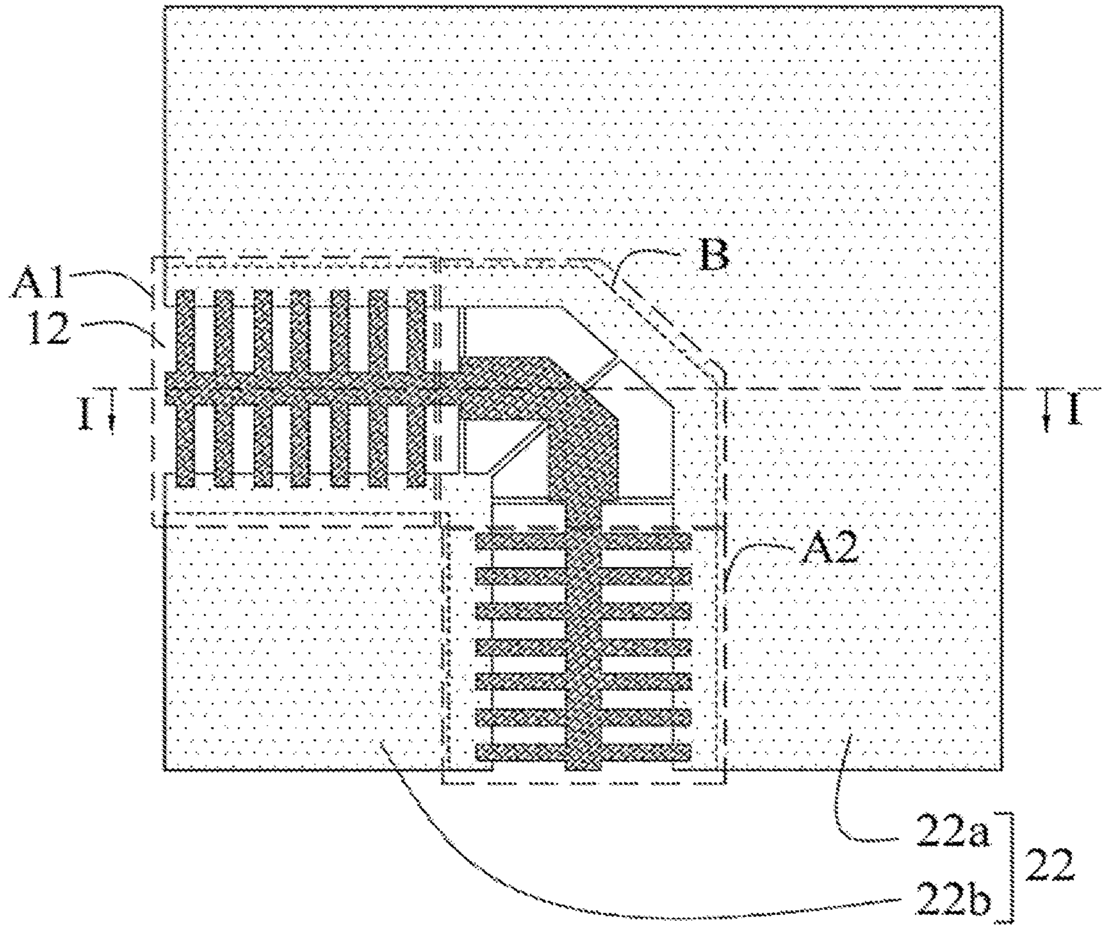
FIG. 1 is a schematic partial top view of a signal line and a reference electrode of a phase shifter according to a first embodiment of the present disclosure.

To make the objects, technical solutions and advantages of the present disclosure more apparent, the present disclosure will be described in further detail with reference to the accompanying drawings. Apparently, the described embodiments are only some, but not all, of embodiments of the present disclosure. All other embodiments, which can be obtained by one of ordinary skill in the art without making any creative effort based on the embodiments described herein, also fall with the protection scope of the present disclosure.

The shapes and sizes of the components in the drawings are not necessarily drawn to scale, but are merely intended to facilitate understanding of the contents of the embodiments of the present disclosure.

Unless defined otherwise, technical or scientific terms used herein shall have the ordinary meaning as understood by one of ordinary skill in the art to which this disclosure belongs. The terms of “first”, “second”, and the like used herein are not intended to indicate any order, quantity, or importance, but rather are used for distinguishing one element from another. Further, the terms “a”, “an”, “the”, or the like does not denote a limitation of quantity, but rather denote the presence of at least one element. The term of “comprising”, “including”, or the like, means that the element or item preceding the term contains the element or item listed after the term and its equivalent, but does not exclude the presence of other elements or items. The terms “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Embodiments of the present disclosure are not limited to the embodiments shown in the drawings, but include modifications of configurations formed based on a manufacturing process. Thus, the regions illustrated in the figures are illustrative, and the shapes of the regions shown in the figures illustrate specific shapes of regions of elements, but are not intended to be limitative.

Figure 2:
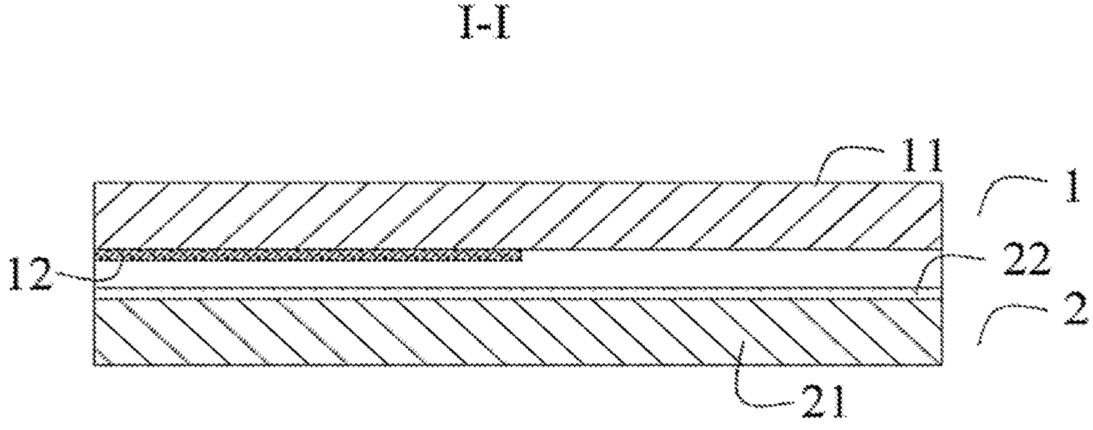
FIG. 2 is a schematic cross-sectional view taken along a line I-I as shown in FIG. 1.
Figure 3:
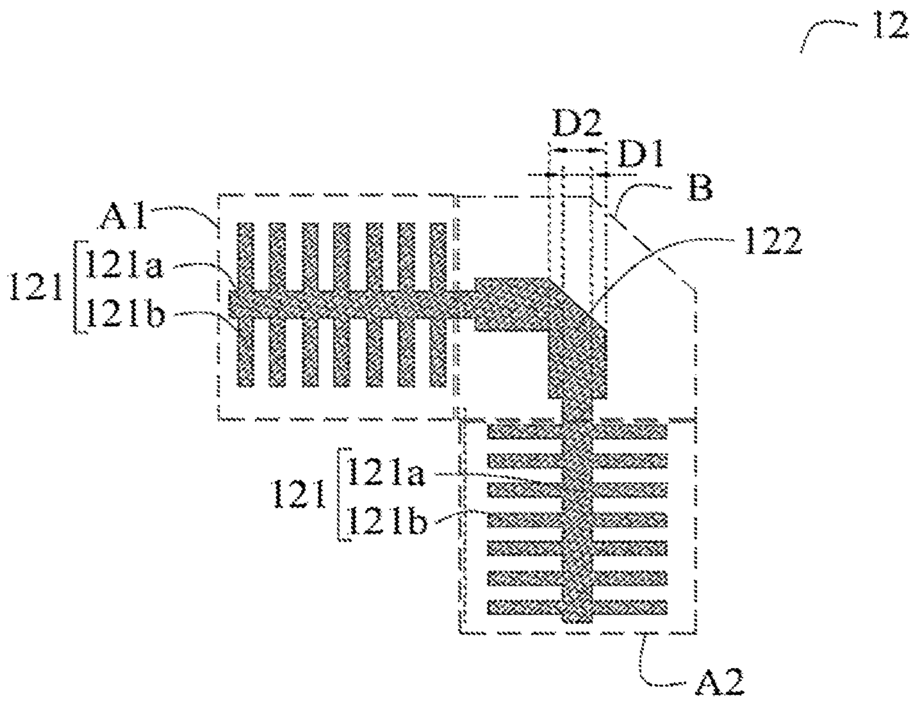
FIG. 3 is a schematic partial top view of a signal line employed in the first embodiment of the present disclosure.
Figure 4:
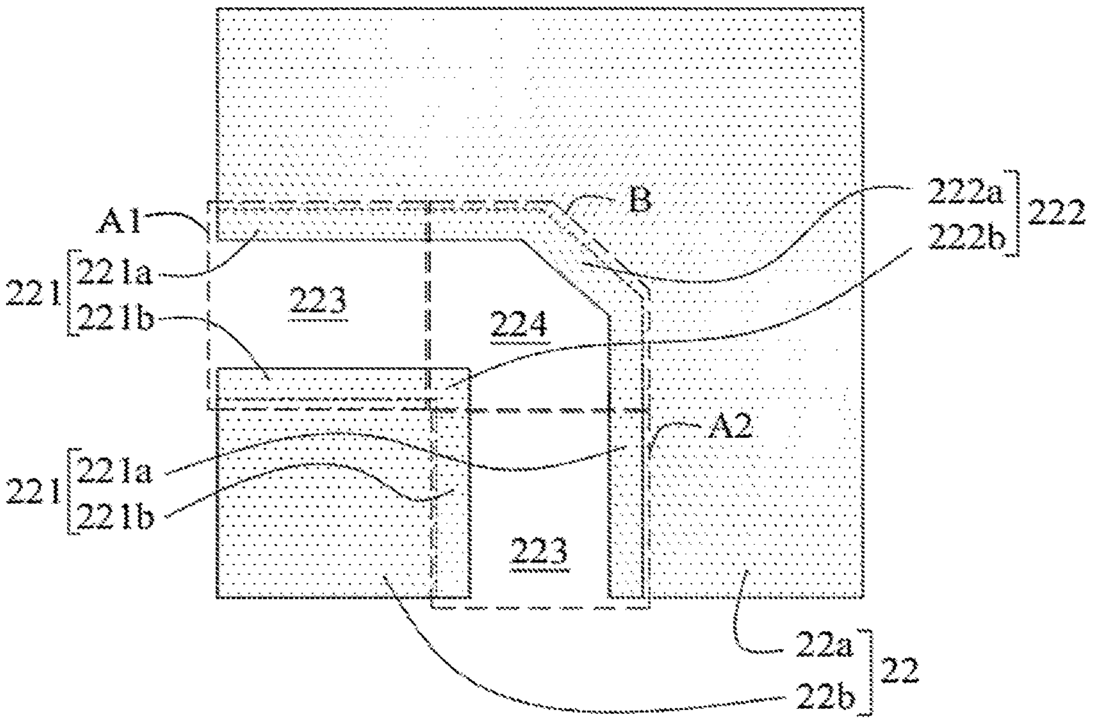
FIG. 4 is a schematic partial top view of a reference electrode employed in the first embodiment of the present disclosure.

In a first aspect, a first embodiment of the present disclosure provides a phase shifter, and FIG. 1 is a schematic partial top view of a signal line and a reference electrode of the phase shifter according to the first embodiment of the present disclosure. FIG. 2 is a schematic cross-sectional view taken along a line I-I as shown in FIG. 1. FIG. 3 is a schematic partial top view of a signal line employed in the first embodiment of the present disclosure. FIG. 4 is a schematic partial top view of a reference electrode employed in the first embodiment of the present disclosure. Referring to FIGS. 1 to 4, the phase shifter includes a first substrate 1 and a second substrate 2 disposed opposite to each other, and a dielectric layer (not shown) disposed between the first substrate 1 and the second substrate 2. Taking an example in which the phase shifter includes a coplanar waveguide (CPW) transmission line, the first substrate 1 includes a first base plate 11, and the second substrate 2 includes a second base plate 21. Further, a signal line 12 and a reference electrode 22 are respectively disposed on sides of different ones or are both disposed on a same side of a same one of the first base plate 11 and the second base plate 21 proximal to the dielectric layer. In the present embodiment, the signal line 12 and the reference electrode 22 are disposed on different base plates, respectively. That is, the signal line 12 is disposed on a side of the first base plate 11 proximal to the dielectric layer, and the reference electrode 22 is disposed on a side of the second base plate 21 proximal to the dielectric layer.

Further, the phase shifter includes a straight unit and a bent unit in an extending direction of the signal line 12, and for example, two straight units (A1, A2) and a bent unit B located between the two straight units (A1, A2) are shown in FIGS. 1 and 4. In the present embodiment, the two straight units (A1, A2) each is configured as a phase shifter unit capable of changing a phase of a signal, and the bent unit is configured to transmit the signal.

Specifically, as shown in FIGS. 3 and 4, the signal line 12 includes a first signal sub-line 121 corresponding to each straight unit, and a second signal sub-line 122 corresponding to the bent unit B. The reference electrode 22 includes a first reference sub-electrode 221 corresponding to each straight unit, and a second reference sub-electrode 222 corresponding to the bent unit B. In some optional embodiments, the reference electrode 22 includes two sub-electrodes (22*a*, 22*b*) having therebetween a spacing region extending parallel to the signal line 12, and the signal line 12 is located in the spacing region. Further, the signal line 12 has two surfaces, which are opposite to the spacing region, and are parallel to each other in the extending direction of the signal line 12. Here, edge portions of the two sub-electrodes (22*a*, 22*b*) proximal to the spacing region serve as the first reference sub-electrodes 221 and the second reference sub-electrode 222, respectively. FIG. 4 merely exemplarily shows regions of the two sub-electrodes (22*a*, 22*b*) where the first reference sub-electrodes 221 and the second reference sub-electrode 222 are located, by using dotted lines, but in a practical application, shapes and sizes of the first reference sub-electrodes 221 and the second reference sub-electrode 222 are not limited thereto.

The second signal sub-line 122 and the second reference sub-electrode 222 which correspond to the bent unit B are configured such that an impedance of the bent unit B matches to an impedance of each straight unit adjacent to the bent unit B. By designing structures of the second signal sub-line 122 and the second reference sub-electrode 222 which correspond to the bent unit B, impedance matching can be achieved, thereby reducing an energy loss of a signal, and achieving effective transmission of the signal. The impedance matching means that the impedance of the bent unit is equal or substantially equal to the impedance of each straight unit adjacent to the bent unit, such that a transmission performance of the signal meets requirements.

It should be noted that in the present embodiment, the two straight units (A1, A2) and the bent unit B located therebetween are taken as an example, but an embodiment of the present disclosure is not limited thereto. For example, the bent unit B may be arranged adjacent to another bent unit, and in this case, the second signal sub-line 122 and the second reference sub-electrode 222 which correspond to the bent unit B are configured to such that the impedance of the bent unit B matches to an impedance of the another bent unit adjacent to the bent unit B. In a practical application, the numbers and the arrangement sequence of the bent units and the straight units may be freely set according to actual requirements.

In some optional embodiments, as shown in FIGS. 3 and 4, the first signal sub-line 121 corresponding to each of the two straight units (A1, A2) includes a first signal line main body 121*a* having a straight-line shape and at least one first branch 121*b* connected to the first signal line main body 121*a*. Each first reference sub-electrode 221 includes two first electrode main bodies (221*a*, 221*b*) which have a straight-line shape, respectively, are disposed on both sides of the first signal line main body 121*a*, and are spaced apart from each other. That is, the two first electrode main bodies (221*a*, 221*b*) have a spacing region 223 therebetween. The first signal line main body 121*a* is located in the spacing region 223, and extending directions of the two first electrode main bodies (221*a*, 221*b*) are parallel to an extending direction of the first signal line main body 121*a*. A signal is fed in one of both ends of the signal line 12, and is fed out from the other of both ends of the signal line 12. Further, the signal is confined between the first signal line main body 121*a* and each of the two first electrode main bodies (221*a*, 221*b*).

With reference to FIGS. 1, 3 and 4, for each straight unit, each first branch 121*b* overlaps the two first electrode main bodies (221*a*, 221*b*) to form a variable capacitor, and when a signal is input to the first signal line main body 121*a*, a dielectric constant of the dielectric layer in the variable capacitor formed by the overlapping of each first branch 121*b* and the two first electrode main bodies (221*a*, 221*b*) is changed, such that a capacitance of the variable capacitor is changed to change a phase of the signal. Overlapping areas of variable capacitors formed by the overlapping of first branches 121*b* and the two first electrode main bodies (221*a*, 221*b*) in each straight unit may be identical to each other or different from each other.

It should be noted that the phase shifter may include a plurality of variable capacitors, or only one variable capacitor, and correspondingly, a plurality of first branches 121*b* or only one first branch 121*b* may be provided, which may be specifically determined according to a required phase shifting degree.

As shown in FIGS. 3 and 4, the second signal sub-line 122 corresponding to the bent unit B includes a second signal line main body. The second reference sub-electrode 222 includes two second electrode main bodies (222*a*, 222*b*) disposed to be spaced apart from each other on both sides of the second signal line main body, i.e., the two second electrode main bodies (222*a*, 222*b*) have a spacing region 224 therebetween. The second signal line main body is located in the spacing region 224, and extending directions of the second electrode main bodies (222*a*, 222*b*) are both parallel to an extending direction of the second signal line main body. In order to realize the impedance matching between the bent unit B and each straight unit adjacent to the bent unit B, a line width of the second signal line main body corresponding to the bent unit B and a distance between the second electrode main bodies (222*a*, 222*b*) satisfy the requirement that the impedance of the bent unit B matches to the impedance of each straight unit adjacent to the bent unit B.

In a practical application, the bent unit B may be arranged adjacent to another bent unit, and in this case, in order to achieve impedance matching between the bent unit B and the another bent unit adjacent to the bent unit B, the line width of the second signal line main body corresponding to the bent unit B and the distance between the second electrode main bodies (222*a*, 222*b*) satisfy the requirement that the impedance of the bent unit B matches to an impedance of the another bent unit adjacent to the bent unit B.

It should be noted that if the line width of the second signal line main body corresponding to the bent unit B and the distance between the two second electrode main bodies (222*a*, 222*b*) vary, a distance between the second signal line main body and each of the second electrode main bodies varies. That is, by adjusting the line width of the second signal line main body and the distance between the two second electrode main bodies (222*a*, 222*b*), the distance between the second signal line main body and each of the second electrode main bodies may be changed, thereby achieving the impedance matching between the bent unit B and a straight unit (or another bent unit) adjacent to the bent unit B.

In some optional embodiments, for the bent unit B and each straight unit adjacent to the bent unit B, a distance between the second signal line main body corresponding to the bent unit B and each second electrode main body is less than the distance between the first signal line main body 121*a* corresponding to the straight unit and each first electrode main body, such that the impedance of the bent unit B matches to the impedance of the straight unit adjacent to the bent unit B. For example, as shown in FIG. 4, the spacing region 224 between the two second electrode main bodies (222*a*, 222*b*) corresponding to the bent unit B and the spacing region 223 between the two first electrode main bodies (221*a*, 221*b*) corresponding to each straight unit adjacent to the bent unit B have a same size, and as shown in FIG. 3, a line width D2 of the second signal line main body corresponding to the bent unit B is greater than a line width D1 of the first signal line main body 121*a* corresponding to each straight unit adjacent to the bent unit B. That is, in the case where the distance between the two electrode main bodies is constant, the larger the line width of the signal line main body is, the smaller the distance between the signal line main body and each electrode main body is. The impedance matching between the bent unit B and each straight unit (or another bent unit) adjacent to the bent unit B can be realized by making the distance between the second signal line main body corresponding to the bent unit and each second electrode main body different from the distance between the first signal line main body corresponding to the straight unit and each first electrode main body.

Figure 5:
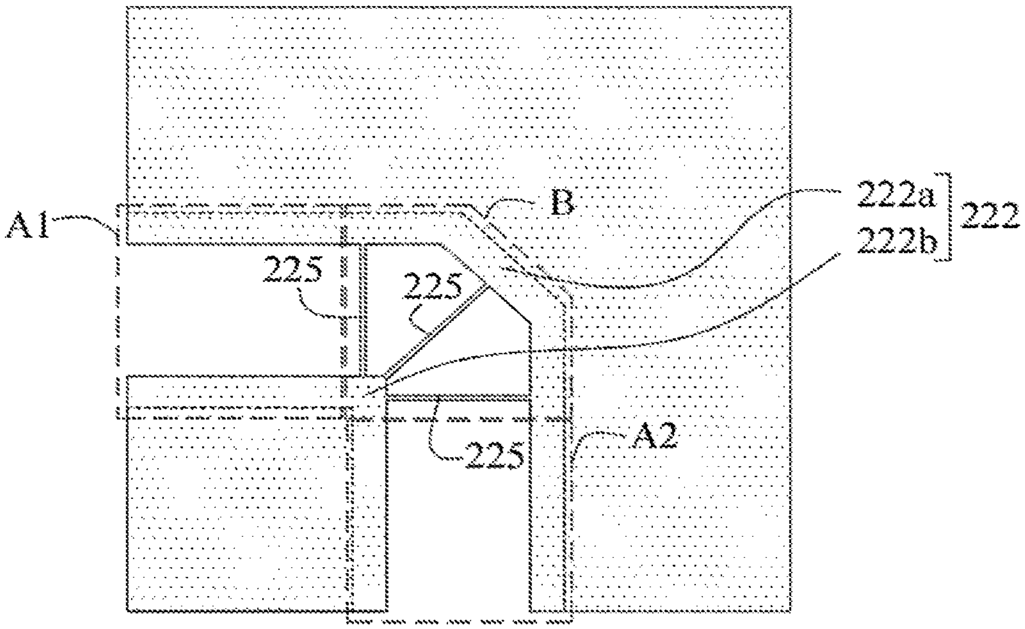
FIG. 5 is another schematic partial top view of a reference electrode employed in the first embodiment of the present disclosure.

In some optional embodiments, FIG. 5 is another schematic partial top view of a reference electrode employed in the first embodiment of the present disclosure. As shown in FIG. 5, at least one tuning bridge 225 is connected between the two second electrode main bodies (222*a*, 222*b*) corresponding to the bent unit B. The at least one tuning bridge 225 is disposed in a plane different from a plane where the second signal sub-line 122 (i.e., the second signal line main body) is disposed, and is arranged to be spaced apart from each other along the extending direction of the second signal line main body. Specifically, the at least one tuning bridge 225 is disposed on the base plate (i.e., the second base plate 21) on which the reference electrode 22 is disposed, and is disposed on the same plane as the two second electrode main bodies (222*a*, 222*b*). Further, the at least one tuning bridge 225 is disposed in the spacing region 224 between the two second electrode main bodies (222*a*, 222*b*), and both ends of each tuning bridge 225 are respectively connected to the two second electrode main bodies (222*a*, 222*b*). Since lengths of spacing regions between the second signal line main body corresponding to the bent unit B and the two second electrode main bodies (222*a*, 222*b*) in the extending direction of the second signal line main body are different from each other, i.e., the length of the spacing region between the second signal line main body and the second electrode main body 222*a*, which has a larger bending radius, in the extending direction of the second signal line main body is greater than the length of the spacing region between the second signal line main body and the second electrode main body 222*b*, which has a smaller bending radius, in the extending direction of the second signal line main body, in a transmission process of a signal, transmission paths of the signal on both sides of the second signal line main body are different from each other, causing an odd mode to be generated. In this regard, by providing the at least one tuning bridge 225, the odd mode can be eliminated, thereby achieving the impedance matching between the bent unit B and each straight unit (or another bent unit) adjacent to the bent unit B.

It should be noted that in a practical application, parameters such as the number, size, and arrangement, of the tuning bridges 225 may be set according to the impedance matching between the bent unit B and each straight unit (or another bent unit) adjacent to the bent unit B.

It should be further noted that in the present embodiment, the signal line 12 is located on the side of the first base plate 11 proximal to the dielectric layer, and the reference electrode 22 is located on the side of the second base plate 21 proximal to the dielectric layer. However, an embodiment of the present disclosure is not limited thereto, and in a practical application, both the signal line 12 and the reference electrode 22 may alternatively be located on a same base plate. That is, the signal line 12 and the reference electrode 22 form a CPW transmission line, and at least one patch electrode is disposed on a side of the other base plate proximal to the dielectric layer. In this case, for each straight unit, patch electrodes are provided to be in one-to-one correspondence with the first branches 121*b*, and an orthogonal projection of each patch electrode on the first base plate at least partially overlaps an orthogonal projection of a corresponding first branch 121*b* on the first base plate. In this case, each first branch 121*b* is located in the spacing region 223 between the two first electrode main bodies (221*a*, 221*b*) and does not overlap with each first electrode main body. Further, in some optional embodiments, the orthogonal projection of each patch electrode on the first base plate at least partially overlaps an orthogonal projection of the reference electrode 22 on the first base plate. In this case, each patch electrode and the corresponding first branch 121*b* overlap each other to form a variable capacitor, and when a signal is input to the signal line 12, a certain difference exists between the voltages applied to the patch electrode and the corresponding first branch 121*b*, such that the dielectric constant of the dielectric layer in the variable capacitor formed by the overlapping of the patch electrode and the corresponding first branch 121*b* is changed, and a capacitance of the variable capacitor is changed, thereby changing a phase of the signal.

Figure 6:
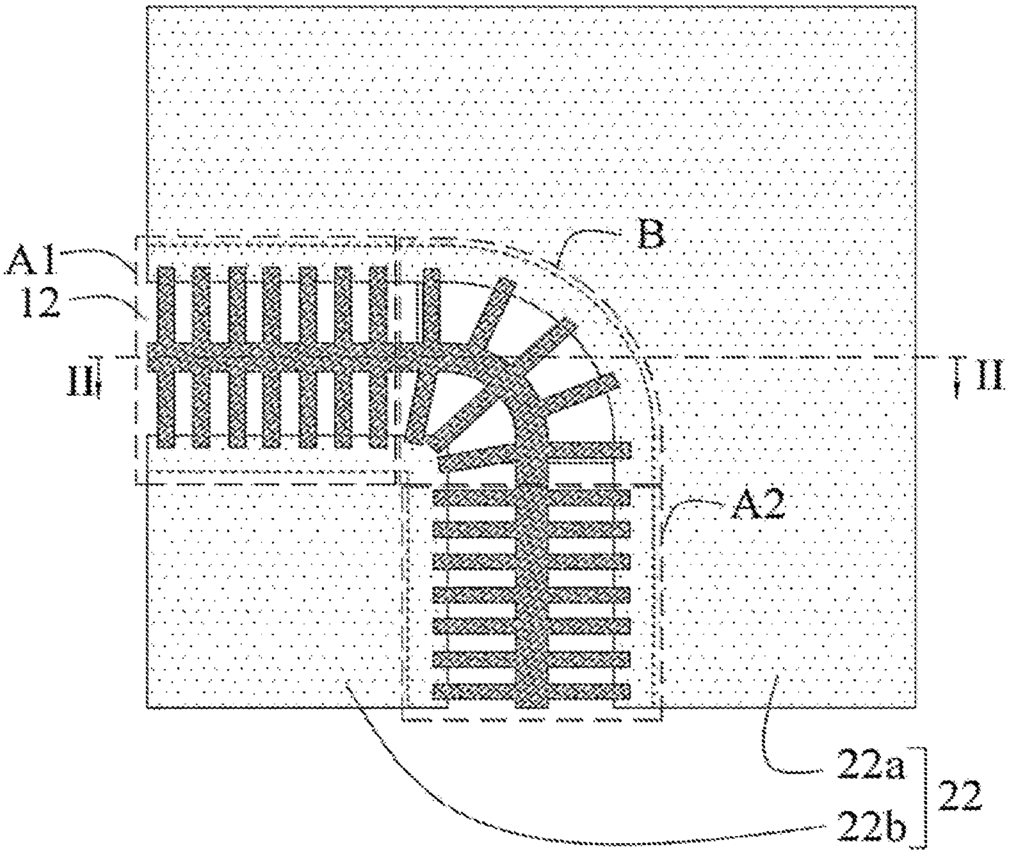
FIG. 6 is a schematic partial top view of a signal line and a reference electrode of a phase shifter according to a second embodiment of the present disclosure.
Figure 7:
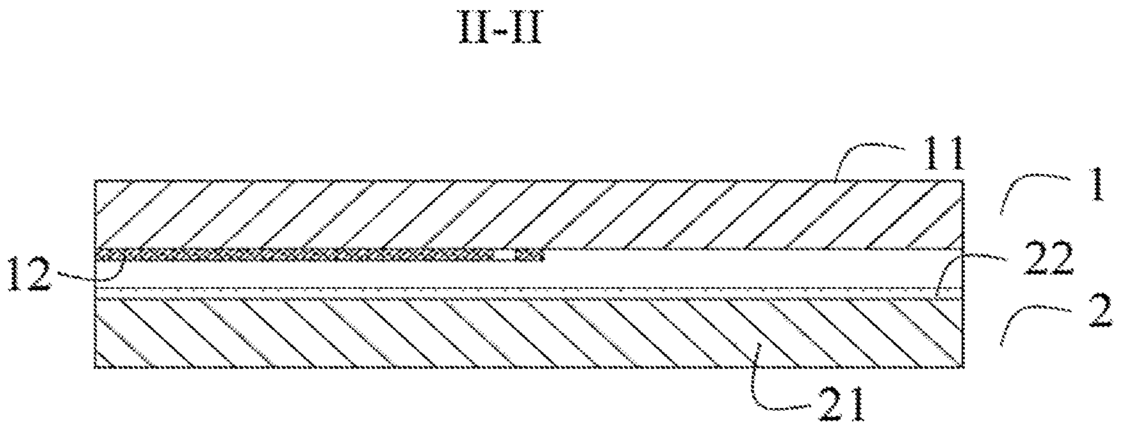
FIG. 7 is a schematic cross-sectional view taken along a line II-II as shown in FIG. 6.
Figure 8:
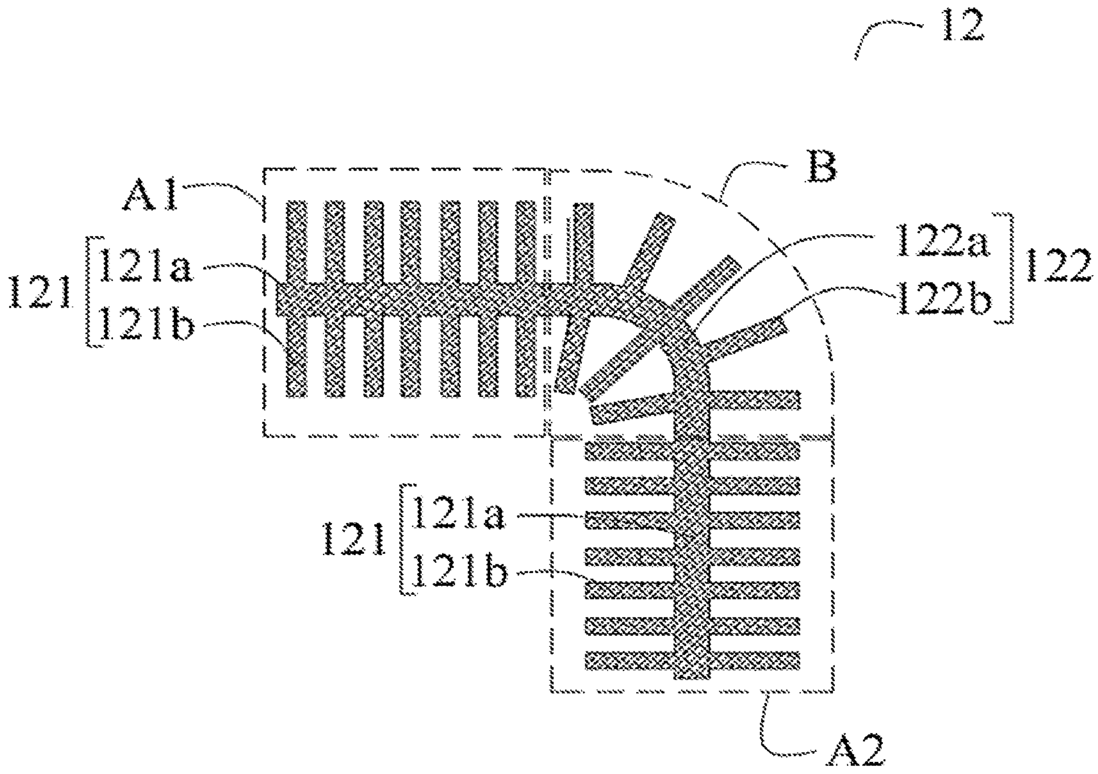
FIG. 8 is a schematic partial top view of a signal line employed in the second embodiment of the present disclosure.
Figure 9:
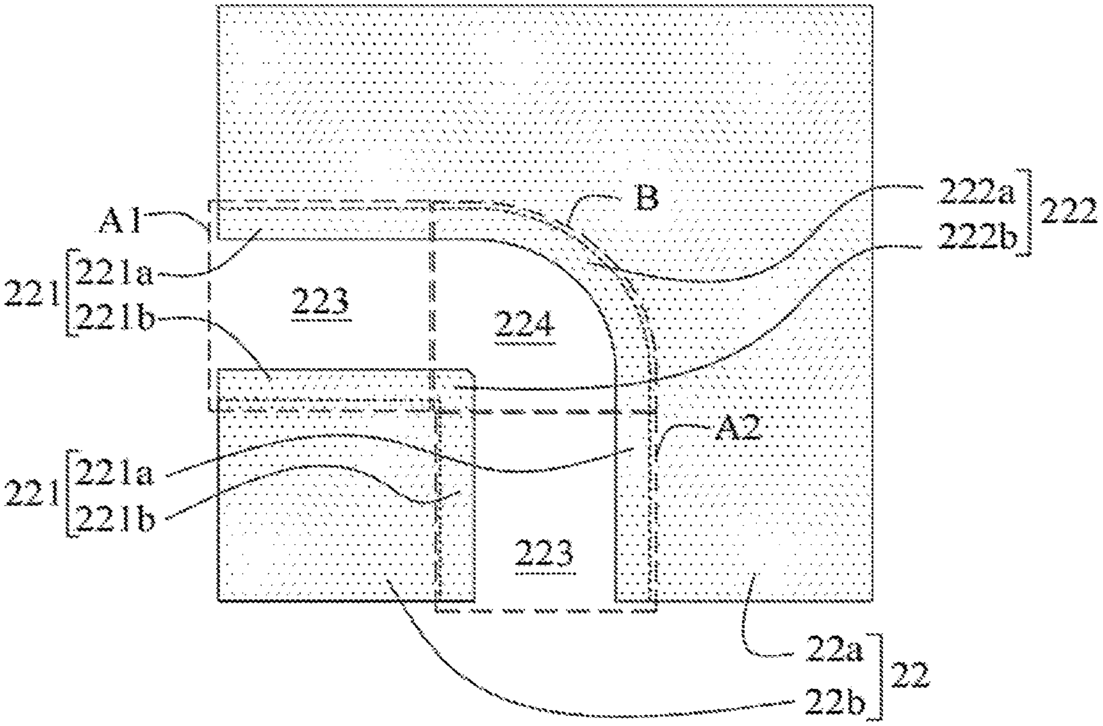
FIG. 9 is a schematic partial top view of a reference electrode employed in the second embodiment of the present disclosure.

In the first embodiment, the bent unit B is configured to transmit a signal, but an embodiment of the present disclosure is not limited thereto. The bent unit B may be alternatively configured as a phase shifter unit capable of changing a phase of a signal, which is beneficial to reducing the overall layout area of the phase shifter, improving the compactness of the structure, and realizing the miniaturization of the phase shifter. Specifically, FIG. 6 is a schematic partial top view of a signal line and a reference electrode of a phase shifter according to a second embodiment of the present disclosure, and FIG. 7 is a schematic cross-sectional view taken along a line II-II as shown in FIG. 6. FIG. 8 is a schematic partial top view of the signal line employed in the second embodiment of the present disclosure, and FIG. 9 is a schematic partial top view of the reference electrode employed in the second embodiment of the present disclosure. As shown in FIGS. 6 to 9, the phase shifter includes the first substrate 1 and the second substrate 2 disposed opposite to each other, and the dielectric layer (not shown) disposed between the first substrate 1 and the second substrate 2. Taking an example in which the phase shifter employs a coplanar waveguide (CPW) transmission line, the first substrate 1 includes the first base plate 11, and the second substrate 2 includes the second base plate 21. Further, the signal line 12 and the reference electrode 22 are respectively disposed on sides of different ones or are both disposed on a same side of a same one of the first base plate 11 and the second base plate 21 proximal to the dielectric layer. In the present embodiment, the signal line 12 and the reference electrode 22 are disposed on different base plates, respectively. That is, the signal line 12 is disposed on the side of the first base plate 11 proximal to the dielectric layer, and the reference electrode 22 is disposed on the side of the second base plate 21 proximal to the dielectric layer.

Further, the phase shifter includes a straight unit and a bent unit in the extending direction of the signal line 12, and for example, two straight units (A1, A2) and a bent unit B located between the two straight units (A1, A2) are shown in FIGS. 6 and 8. In the present embodiment, both the two straight units (A1, A2) and the bent unit B each are configured as a phase shifter unit capable of changing a phase of a signal.

Specifically, as shown in FIGS. 8 and 9, the signal line 12 includes a first signal sub-line 121 corresponding to each straight unit, and a second signal sub-line 122 corresponding to the bent unit B. The reference electrode 22 includes a first reference sub-electrode 221 corresponding to each straight unit, and a second reference sub-electrode 222 corresponding to the bent unit B. In some optional embodiments, the reference electrode 22 includes two sub-electrodes (22*a*, 22*b*) having therebetween a spacing region extending parallel to the signal line 12, and the signal line 12 is located in the spacing region. Further, the signal line 12 has two surfaces, which are opposite to the spacing region, respectively, and are parallel to each other in the extending direction of the signal line 12. Here, the edge portions of the two sub-electrodes (22*a*, 22*b*) proximal to the spacing region serve as the first reference sub-electrodes 221 and the second reference sub-electrode 222, respectively. FIGS. 6 and 9 merely exemplarily show regions of the two sub-electrodes (22*a*, 22*b*) where each first reference sub-electrode 221 and the second reference sub-electrode 222 are located, by using dotted lines, but in a practical application, shapes and sizes of each first reference sub-electrode 221 and the second reference sub-electrode 222 are not limited thereto.

The second signal sub-line 122 and the second reference sub-electrode 222 which correspond to the bent unit B are configured such that the impedance of the bent unit B matches to the impedance of each straight unit adjacent to the bent unit B. The impedance of the bent unit B or each straight unit adjacent to the bent unit B is an input impedance of the phase shifter unit formed by the bent unit B or each straight unit adjacent to the bent unit B. By designing structures of the second signal sub-line 122 and the second reference sub-electrode 222 corresponding to the bent unit B, impedance matching can be achieved, such an energy loss of a signal can be reduced, and effective transmission of the signal can be achieved. The impedance matching means that the impedance of the bent unit B is equal or substantially equal to the impedance of each straight unit adjacent to the bent unit B such that a transmission performance of a signal meets requirements.

It should be noted that in the present embodiment, the two straight units (A1, A2) and the bent unit B located between the two straight units (A1, A2) are taken as an example, but an embodiment of the present disclosure is not limited thereto. For example, the bent unit B may also be arranged adjacent to another bent unit, and in this case, the second signal sub-line 122 and the second reference sub-electrode 222 corresponding to the bent unit B are configured such that the impedance of the bent unit B matches to the impedance of the another bent unit adjacent to the bent unit B. In a practical application, the numbers and the arrangement sequence of the bent units and the straight units may be freely set according to actual requirements.

In some optional embodiments, as shown in FIGS. 8 and 9, the first signal sub-line 121 corresponding to each of the two straight units (A1, A2) includes a first signal line main body 121*a*, which has a straight-line shape, and at least one first branch 121*b* connected to the first signal line main body 121*a*. Each first reference sub-electrode 221 includes two first electrode main bodies (221*a*, 221*b*), which have a straight-line shape, respectively, disposed on both sides of the first signal line main body 121*a*, and are spaced apart from each other. That is, the two first electrode main bodies (221*a*, 221*b*) have therebetween a spacing region 223 in which the first signal line main body 121*a* is located, and extending directions of the two first electrode main bodies (221*a*, 221*b*) are both parallel to the extending direction of the first signal line main body 121*a*. A signal is fed in one of both ends of the signal line 12, and fed out from the other of both ends of the signal line 12. Further, the signal is confined between the first signal line main body 121*a* and each of the two first electrode main bodies (221*a*, 221*b*).

With reference to FIGS. 1, 8 and 9, for each straight unit, each first branch 121*b* overlaps two first electrode main bodies (221*a*, 221*b*) to form a variable capacitor, and when a signal is input to the first signal line main body 121*a*, the dielectric constant of the dielectric layer in the variable capacitor formed by the overlapping of each first branch 121*b* and two first electrode main bodies (221*a*, 221*b*) is changed, such that the capacitance of the variable capacitor is changed to change a phase of the signal. Overlapping areas of variable capacitors formed by the overlapping of first branches 121*b* and the two first electrode main bodies (221*a*, 221*b*) in each straight unit may be identical to each other or different from each other.

It should be noted that the phase shifter may include a plurality of variable capacitors or only one variable capacitor, and accordingly, a plurality of first branches 121*b* or only one first branch 121*b* may be provided, which may be specifically determined according to a required phase shifting degree.

As shown in FIGS. 8 and 9, the second signal sub-line corresponding to the bent unit B includes a second signal line main body 122*a*, and the second reference sub-electrode 222 includes two second electrode main bodies (222*a*, 222*b*) which are disposed on both sides of the second signal line main body and are spaced apart from each other. That is, the two second electrode main bodies (222*a*, 222*b*) have therebetween a spacing region 224 in which the second signal line main body 122*a* is located, and extending directions of the second electrode main bodies (222*a*, 222*b*) are both parallel to the extending direction of the second signal line main body 122*a*.

In addition, a spacing region between one of the two second electrode main bodies (222*a*, 222*b*) which has a larger bending radius (i.e., the second electrode main body 222*a*) and the second signal line main body 122*a* is a first spacing region, and a spacing region between the other of the two second electrode main bodies which has a smaller bending radius (i.e., the second electrode main body 222*b*) and the second signal line main body 122*a* is a second spacing region. That is, two spacing sub-regions of the spacing region 224 which are located on both sides of the second signal line main body 122*a* serve as the first spacing region and the second spacing region, respectively. At least one of the first and second spacing regions is provided with at least one second branch 122*b*. For example, as shown in FIGS. 6 and 8, each of the first and second spacing regions is provided therein a plurality of second branches 122*b*, and the plurality of second branches 122*b* in a same spacing region are arranged to be spaced apart from each other along the extending direction of the second signal line main body 122*a*. Further, each of the second branches 122*b* is connected to the second signal line main body 122*a* and at least one of the two second electrode main bodies (222*a*, 222*b*). For example, each of the second branches 122*b* shown in FIGS. 6 and 8 is connected to the second signal line main body 122*a*.

Similar to each straight unit, taking an example in which each second branch 122*b* is connected to the second signal line main body 122*a*, each second branch 122*b* overlaps the two second electrode main bodies (222*a*, 222*b*) to form a variable capacitor, and when a signal is input to the second signal line main body 122*a*, a dielectric constant of the dielectric layer in the variable capacitor formed by the overlapping of each second branch 122*b* and the two second electrode main bodies (222*a*, 222*b*) is changed, such that a capacitance of the variable capacitor is changed, thereby changing a phase of the signal. As such, the bent unit B forms a phase shifter unit that can change a phase of the signal.

Figure 10:
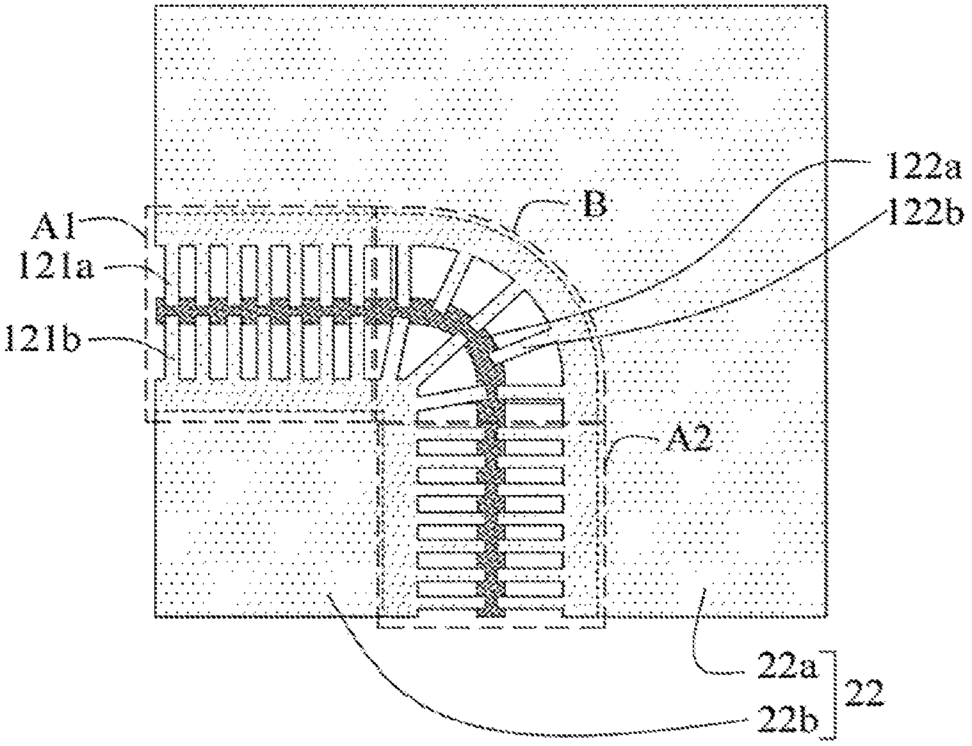
FIG. 10 is another schematic partial top view of a signal line and a reference electrode of a phase shifter according to the second embodiment of the present disclosure.

In other optional embodiments, for the bent unit B, each second branch 122*b* may be connected to at least one of the two second electrode main bodies (222*a*, 222*b*). For example, as shown in FIG. 10, each of the first spacing region and the second spacing region is provided therein with a plurality of second branches 122*b*. Further, the second branches 122*b* located in the first spacing region are connected to the second electrode main body 222*a* with a larger bending radius, and the second branches 122*b* located in the second spacing region are connected to the second electrode main body 222*b* with a smaller bending radius. In addition, an orthogonal projection of each second branch 122*b* on the first base plate partially overlaps an orthogonal projection of the second signal line main body 122*a* on the first base plate, i.e., each second branch 122*b* and the second signal line main body 122*a* overlap each other to form a variable capacitor. In this case, for each straight unit, each first branch 121*b* is connected to the corresponding first electrode main bodies, and an orthogonal projection of each first branch 121*b* on the first base plate partially overlaps an orthogonal projection of the first signal line main body 121*a* on the first base plate, i.e., each first branch 121*b* forms a variable capacitor with the corresponding first electrode main bodies and the first signal line main body 121*a*.

It should be noted that in a transmission process of a signal, there is a difference between the transmission paths for the signal on both sides of the second signal line main body 122*a* corresponding to the bent unit B, and therefore, by making the arrangement of the second branches 122*b* located on one side of the second signal line main body 122*a* be asymmetric to the arrangement of the second branches 122*b* located on the other side of the second signal line main body 122*a*, the impedance of the bent unit B matches to the impedance of each straight unit adjacent to the bent unit B. There are many asymmetric arrangement manners. In some optional embodiments, widths of the second branches 122*b* are identical to each other. The number of the second branches 122*b* in the first spacing region between one of the two second electrode main bodies (222*a*, 222*b*) which has a larger bending radius (i.e., the second electrode main body 222*a*) and the second signal line main body 122*a* is greater than the number of the second branches 122*b* in the second spacing region between the other one of the two second electrode main bodies (222*a*, 222*b*) which has a smaller bending radius (i.e., the second electrode main body 222*b*) and the second signal line main body 122*a*. Apparently, an embodiment of the disclosure is not limited thereto, and in a practical application, the number, size and arrangement of the second branches 122*b* may be set according to the situation of impedance matching.

In the present embodiment, in addition to that impedance matching is achieved by setting the structure of the second branches 122*b*, for the bent unit B and each straight unit adjacent to the bent unit B, as shown in FIGS. 6, 8 and 9, a distance between the second signal line main body 122*a* corresponding to the bent unit B and each second electrode main body is equal to a distance between the first signal line main body 121*a* corresponding to each straight unit adjacent to the bent unit B and each first electrode main body. In some optional embodiments, a distance between the two second electrode main bodies (222*a*, 222*b*) corresponding to the bent unit B is equal to a distance between the two first electrode main bodies (221*a*, 221*b*) corresponding to each straight unit adjacent to the bent unit B, and a line width of the second signal line main body 122*a* corresponding to the bent unit B is equal to a line width of the first signal line main body 121*a* corresponding to each straight unit adjacent to the bent unit B. Alternatively, the distance between the second signal line main body 122*a* corresponding to the bent unit B and each second electrode main body may be different from the distance between the first signal line main body 121*a* corresponding to each straight unit adjacent to the bent unit B and each first electrode main body, according to the situation of impedance matching.

Figure 11:
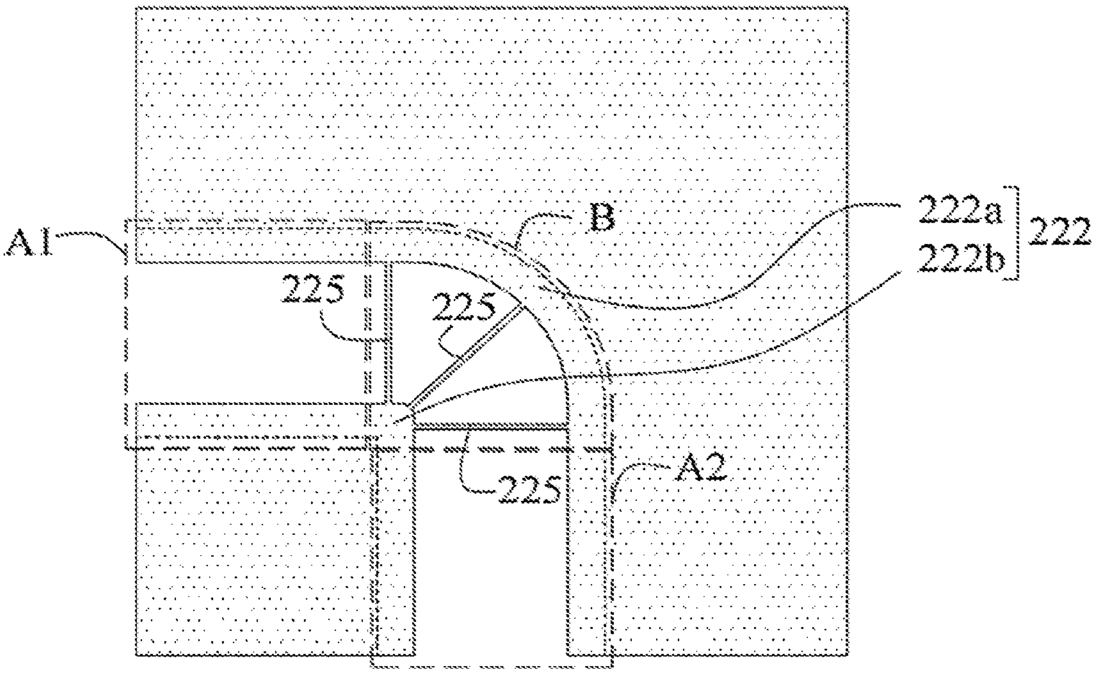
FIG. 11 is another schematic partial top view of a reference electrode employed in the second embodiment of the present disclosure.

In some optional embodiments, FIG. 11 is another schematic partial top view of the reference electrode employed in the second embodiment of the present disclosure. As shown in FIG. 11, at least one tuning bridge 225 is connected between the two second electrode main bodies (222*a*, 222*b*) corresponding to the bent unit B, disposed in a plane different from a plane where the second signal line main body 122*a* is located, and is space apart from each other along the extending direction of the second signal line main body 122*a*. Specifically, the at least one tuning bridge 225 is disposed on the base plate (i.e., the second base plate 21) on which the reference electrode 22 is disposed, and disposed in the spacing region 224 between the two second electrode main bodies (222*a*, 222*b*). Further, both ends of each tuning bridge 225 are connected to the two second electrode main bodies (222*a*, 222*b*), respectively. Since lengths, which are in the extending direction of the second signal line main body, of the spacing regions between the second signal line main body corresponding to the bent unit B and the two second electrode main bodies (222*a*, 222*b*) are different from each other, i.e., the length, which is in the extending direction of the second signal line main body, of the spacing region between the second signal line main body and the second electrode main body 222*a* with a larger bending radius is greater than the length, which is in the extending direction of the second signal line main body, of the spacing region between the second signal line main body and the second electrode main body 222*b* with a smaller bending radius, in a transmission process of a signal, the transmission paths for the signal on both sides of the second signal line main body are different from each other, resulting in an odd mode. In this regard, by providing the at least one tuning bridge 225, the odd mode can be avoided, thereby achieving the impedance matching between the bent unit B and each straight unit (or another bent unit) adjacent to the bent unit B.

It should be noted that in a practical application, parameters such as the number, size, and arrangement of the at least tuning bridge 225 may be set according to the impedance matching between the bent unit B and each straight unit (or another bent unit) adjacent to the bent unit B.

Figure 12:
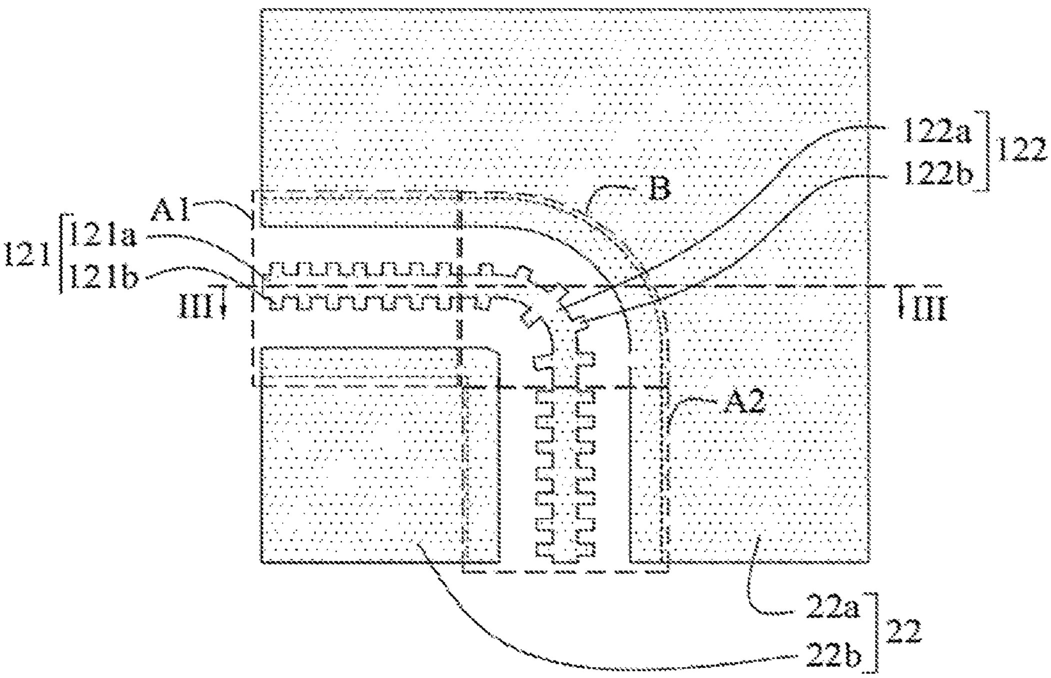
FIG. 12 is a schematic partial top view of a signal line and a reference electrode of a phase shifter according to a third embodiment of the present disclosure.
Figure 13:
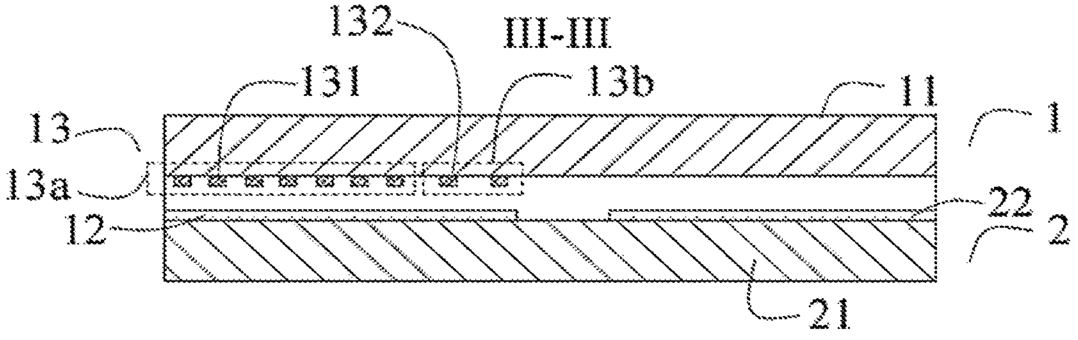
FIG. 13 is a schematic cross-sectional view taken along a line III-III as shown in FIG. 12.
Figure 14:
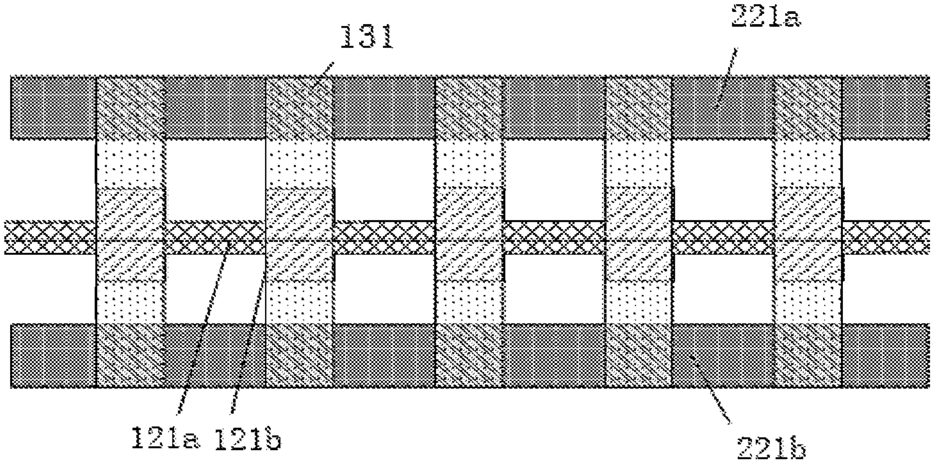
FIG. 14 is a schematic partial structural view of a signal line, a reference electrode and a patch electrode corresponding to a straight unit (or a straight-line unit) employed in a third embodiment of the present disclosure.
Figure 15:
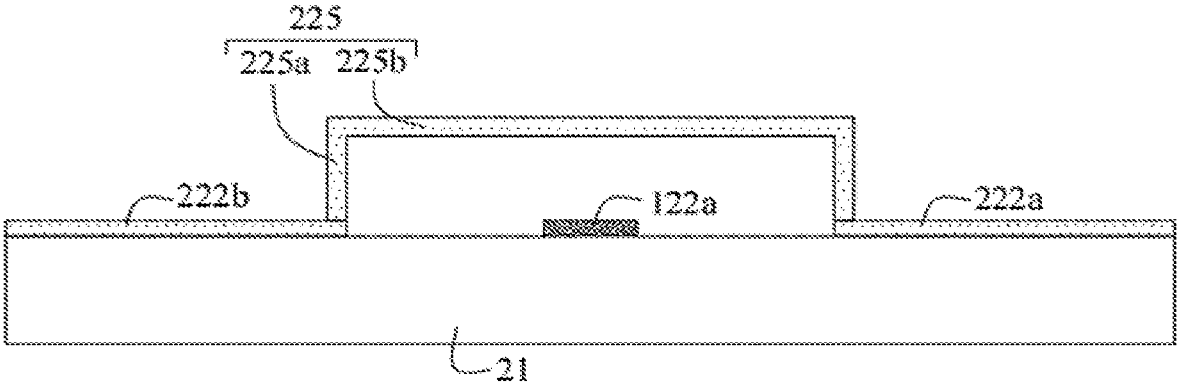
FIG. 15 is a schematic side view of a tuning bridge employed in the third embodiment of the present disclosure.

In the phase shifter according to each of the first and second embodiments, the signal line 12 is located on the side of the first base plate 11 proximal to the dielectric layer, and the reference electrode 22 is located on the side of the second base plate 21 proximal to the dielectric layer. However, an embodiment of the present disclosure is not limited thereto, and in a practical application, the signal line 12 and the reference electrode 22 may alternatively be located on a same base plate. That is, the signal line 12 and the reference electrode 22 form a CPW transmission line, and at least one patch electrode is disposed on the side of the other base plate proximal to the dielectric layer. Specifically, FIG. 12 is a schematic partial top view of a signal line and a reference electrode of a phase shifter according to a third embodiment of the present disclosure, and FIG. 13 is a schematic cross-sectional view taken along a line III-III as shown in FIG. 12. FIG. 14 is a schematic partial structural view of a signal line, a reference electrode and a patch electrode corresponding to a straight unit employed in the third embodiment of the present disclosure, and FIG. 15 is a schematic side view of a tuning bridge employed in the third embodiment of the present disclosure. Referring to FIGS. 12 to 15, both the signal line 12 and the reference electrode 22 are disposed on the side of one of the first base plate 11 and the second base plate 21 proximal to the dielectric layer, and a patch electrode structure 13 is disposed on the side of the other of the first base plate 11 and the second base plate 21 proximal to the dielectric layer. For example, as shown in FIG. 13, both the signal line 12 and the reference electrode 22 are disposed on the side of the second base plate 21 proximal to the dielectric layer, and the patch electrode structure 13 is disposed on the side of the first base plate 11 proximal to the dielectric layer.

The patch electrode structure 13 includes a first patch electrode layer 13*a* and a second patch electrode layer 13*b*. Each straight unit is provided with the first patch electrode layer 13*a*, and each bent unit is provided with the second patch electrode layer 13*b*. As shown in FIG. 14, the first patch electrode layer 13*a* includes at least one first patch electrode 131 disposed in one-to-one correspondence with the at least one first branch 121*b* to form at least one first variable capacitor. An orthogonal projection of each of the at least one first patch electrode 131 on the first base plate at least partially overlaps an orthogonal projection of a corresponding one of the at least one first branch 121*b* on the first base plate. In this case, as shown in FIG. 12, the at least one first branch 121*b* is located in the spacing region 223 between the two first electrode main bodies (221*a*, 221*b*) and does not overlap each of the first electrode main bodies. In some optional embodiments, an orthogonal projection of each first patch electrode 131 on the first base plate at least partially overlaps orthogonal projections of the two first electrode main bodies (221*a*, 221*b*) on the first base plate. In this case, each first patch electrode 131 and the corresponding first branch 121*b* overlap each other to form a variable capacitor, and when a signal is input to the signal line 12, a certain difference exists between voltages applied to each first patch electrode 131 and the corresponding first branch 121*b*, such that a dielectric constant of the dielectric layer in the variable capacitor formed by the overlapping of each first patch electrode 131 and the corresponding first branch 121*b* is changed, and thus a capacitance of the variable capacitor is changed to change a phase of the signal.

Similar to the first patch electrode layer 13*a*, the second patch electrode layer 13*b* includes at least one second patch electrode 132 disposed in one-to-one correspondence with the at least one second branch 122*b* to form at least one second variable capacitor. An orthogonal projection of each of the at least one second patch electrode 132 on the first base plate at least partially overlaps an orthogonal projection of a corresponding one of the at least one second branch 122*b* on the first base plate. In this case, the at least one second branch 122*b* is located in the spacing region 224 between the two second electrode main bodies (222*a*, 222*b*) and does not overlap with each of the second electrode main bodies. In some optional embodiments, an orthogonal projection of each second patch electrode 132 on the first base plate at least partially overlaps an orthogonal projection of each of the two second electrode main bodies (222*a*, 222*b*) on the first base plate. In this case, each second patch electrode 132 and the corresponding second branch 122*b* overlap each other to form a variable capacitor, and when a signal is input to the signal line 12, a certain difference exists between voltages applied to each second patch electrode 132 and the corresponding second branch 122*b*, such that a dielectric constant of the dielectric layer in the variable capacitor formed by the overlapping of each second patch electrode 132 and the corresponding second branch 122*b* is changed, and thus a capacitance of the variable capacitor is changed to change a phase of the signal. Therefore, each of the bent unit B and the straight unit can form a phase shifter unit capable of changing a phase of a signal, which is beneficial to reducing the overall layout area of the phase shifter, improving the structure compactness, and realizing the miniaturization of the phase shifter.

In some optional embodiments, as shown in FIG. 15, at least one tuning bridge 225 is connected between the two second electrode main bodies (222*a*, 222*b*) corresponding to the bent unit B, disposed in a plane different from a plane where the second signal line main body 122*a* is located, and is spaced apart from each other along the extending direction of the second signal line main body 122*a*. Specifically, the at least one tuning bridge 225 is disposed on the base plate (i.e., the second base plate 21) on which the reference electrode 22 is disposed, and disposed in the spacing region between the two second electrode main bodies (222*a*, 222*b*). Further, both ends of each of the at least one tuning bridge 225 are connected to the two second electrode main bodies (222*a*, 222*b*), respectively. There are many manners for disposing the at least one tuning bridge 225 in a plane different from a plane where the second signal line main body 122*a* is located. For example, each tuning bridge 225 includes two supporting portions 225*a* and a crossbeam portion 225*b*. The two supporting portions 225*a* are disposed to be respectively connected to the two second electrode main bodies (222*a*, 222*b*), on the base plate on which the signal line (e.g., the second signal line main body 122*a*) and the reference electrode (e.g., the two second electrode main bodies (222*a*, 222*b*)) are disposed. The crossbeam portion 225*b* is disposed in a plane different from a plane where the two second electrode main bodies (222*a*, 222*b*) are located, and both ends of the crossbeam portion 225*b* are connected to the two supporting portions 225*a*, respectively.

Since the lengths, which are in the extending direction of the second signal line main body, of the spacing regions between the second signal line main body corresponding to the bent unit B and the two second electrode main bodies (222*a*, 222*b*) are different from each other, i.e., the length, which is in the extending direction of the second signal line main body, of the spacing region between the second signal line main body and the second electrode main body 222*a* with a larger bending radius is greater than the length, which is in the extending direction of the second signal line main body, of the spacing region between the second signal line main body and the second electrode main body 222*b* with a smaller bending radius, in a transmission process of a signal, the transmission paths for the signal on both sides of the second signal line main body are different from each other, which results in an odd mode. In this regard, by providing the at least one tuning bridge 225, the odd mode can be avoided, thereby achieving the impedance matching between the bent unit B and each straight unit (or another bent unit) adjacent to the bent unit B.

It should be noted that in a practical application, parameters such as the number, size, and arrangement of the at least one tuning bridge 225 may be set according to the impedance matching between the bent unit B and each straight unit (or another bent unit) adjacent to the bent unit B.

It should be further noted that in a practical application, in a case where the bent unit B is configured to transmit a signal (but not to serve as a phase shifter unit), the structures (including but not limited to the line width, the distance between the signal line and the reference electrode, as well as the number, the size, and the arrangement of the at least one tuning bridge 225) of the second signal sub-line 122 and the second reference sub-electrode 222 which correspond to the bent unit B may be designed, such that the impedance of the bent unit B matches to the impedance of each straight unit adjacent to the bent unit B, and/or matches to the impedance of another bent unit B adjacent to the bent unit B. In the case where the bent unit B is configured as a phase shifter unit capable of changing a phase of a signal, the structures (including but not limited to the line width, the distance between the signal line and the reference electrode, the number, the size and the arrangement of the second branches 122*b*, as well as the number, the size and the arrangement of the tuning bridges 225) of the second signal sub-line 122 and the second reference sub-electrode 222 which correspond to the bent unit B may be designed, such that the impedance of the bent unit B matches to the impedance of each straight unit adjacent to the bent unit B, and/or matches to the impedance of another bent unit B adjacent to the bent unit B.

In some optional embodiments, in the phase shifter according to any one of the embodiments of the present disclosure, at least one bent unit and at least one straight unit may be arranged to form any one of various shapes such as, a U-shape or an S-shape, and a bending angle of each bent unit may be any angle greater than 0°, which is not limited herein.

In the phase shifter according to any one of the embodiments of the present disclosure, the dielectric layer may be a tunable dielectric of various types, for example, the dielectric layer may include a tunable dielectric such as liquid crystal molecules or a ferroelectric.

In a second aspect, an embodiment of the present disclosure provides an antenna, which includes at least one phase shifter described above.

In some optional embodiments, the antenna is a phased array antenna.

It is to be understood that the above embodiments are merely exemplary embodiments employed to illustrate the principles of the present disclosure, and the present disclosure is not limited thereto. It will be apparent to one of ordinary skill in the art that various modifications and improvements may be made therein without departing from the spirit and essence of the present disclosure, and such modifications and improvements are also considered to fall within the scope of the present disclosure.

What is claimed is:

1. A phase shifter, comprising a first substrate and a second substrate opposite to each other and a dielectric layer between the first substrate and the second substrate, wherein the first substrate comprises a first base plate, the second substrate comprises a second base plate, a signal line and a reference electrode are respectively disposed on sides of different ones or are both disposed on a same side of a same one of the first base plate and the second base plate proximal to the dielectric layer, and the phase shifter comprises a straight unit and a bent unit along an extending direction of the signal line;

the signal line comprises a first signal sub-line corresponding to the straight unit and a second signal sub-line corresponding to the bent unit, and the reference electrode comprises a first reference sub-electrode corresponding to the straight unit and a second reference sub-electrode corresponding to the bent unit; and the second signal sub-line and the second reference sub-electrode which correspond to the bent unit are configured to make an impedance of the bent unit match to an impedance of the straight unit which is adjacent to the bent unit, and/or an impedance of another bent unit adjacent to the bent unit.

2. The phase shifter according to claim 1, wherein the first signal sub-line comprises a first signal line main body, which has a straight-line shape, and at least one first branch connected to the first signal line main body, the first reference sub-electrode comprises two first electrode main bodies, which respectively have straight-line shapes and are spaced apart from each other on both sides of the first signal line main body, and extending directions of the two first electrode main bodies are both parallel to an extending direction of the first signal line main body;

the second signal sub-line comprises a second signal line main body, the second reference sub-electrode comprises two second electrode main bodies which are spaced apart from each other on both sides of the second signal line main body, and extending directions of the two second electrode main bodies are both parallel to an extending direction of the second signal line main body; and a line width of the second signal line main body corresponding to the bent unit and a distance between the two second electrode main bodies meet a requirement that the impedance of the bent unit matches to the impedance of the straight unit which is adjacent to the bent unit, and/or the impedance of the another bent unit adjacent to the bent unit.

3. The phase shifter according to claim 2, wherein for the bent unit and the straight unit adjacent to the bent unit, a distance between the second signal line main body and each second electrode main body, which correspond to the bent unit, is less than a distance between the first signal line main body and each first electrode main body, which correspond to the straight unit.

4. The phase shifter according to claim 3, wherein the distance between the two second electrode main bodies corresponding to the bent unit is the same as a distance between the two first electrode main bodies corresponding to the straight unit adjacent to the bent unit, and the line width of the second signal line main body corresponding to the bent unit is greater than a line width of the first signal line main body corresponding to the straight unit adjacent to the bent unit.

5. The phase shifter according to claim 4, wherein at least one tuning bridge is connected between the two second electrode main bodies corresponding to the bent unit, disposed in a plane different from a plane where the second signal line main body is located, and is spaced apart from each other along the extending direction of the second signal line main body.

6. The phase shifter according to claim 3, wherein at least one tuning bridge is connected between the two second electrode main bodies corresponding to the bent unit, disposed in a plane different from a plane where the second signal line main body is located, and is spaced apart from each other along the extending direction of the second signal line main body.

7. The phase shifter according to claim 2, wherein a spacing region between one of the two second electrode main bodies which has a larger bending radius and the second signal line main body is a first spacing region, and a spacing region between the other of the two second electrode main bodies which has a smaller bending radius and the second signal line main body is a second spacing region; and at least one of the first spacing region and the second spacing region is provided with at least one second branch, and each of the at least one second branch is connected to the second signal line main body and at least one of the two second electrode main bodies.

8. The phase shifter according to claim 7, wherein the at least one second branch has a same width.

9. The phase shifter according to claim 8, wherein each of the first spacing region and the second spacing region is provided with at least one second branch, and a number of the at least one second branch in the first spacing region is greater than a number of the at least one second branch in the second spacing region.

10. The phase shifter according to claim 8, wherein at least one tuning bridge is connected between the two second electrode main bodies corresponding to the bent unit, disposed in a plane different from a plane where the second signal line main body is located, and is spaced apart from each other along the extending direction of the second signal line main body.

11. The phase shifter according to claim 7, wherein for the bent unit and the straight unit adjacent to the bent unit, a distance between the second signal line main body and each second electrode main body, which correspond to the bent unit, is equal to a distance between the first signal line main body and each first electrode main body, which correspond to the straight unit.

12. The phase shifter according to claim 11, wherein the distance between the two second electrode main bodies corresponding to the bent unit is equal to a distance between the two first electrode main bodies corresponding to the straight unit adjacent to the bent unit, and the line width of the second signal line main body corresponding to the bent unit is equal to a line width of the first signal line main body corresponding to the straight unit adjacent to the bent unit.

13. The phase shifter according to claim 7, wherein the signal line and the reference electrode are disposed on the sides of different ones of the first base plate and the second base plate proximal to the dielectric layer, respectively;

the at least one first branch is arranged on the base plate where the signal line is arranged, and connected to the first signal line main body, and an orthogonal projection of each first branch on the first base plate partially overlaps an orthogonal projection of each first electrode main body on the first base plate; and the at least one second branch is arranged on the base plate where the signal line is arranged, and connected to the second signal line main body, and an orthogonal projection of each second branch on the first base plate partially overlaps an orthogonal projection of each second electrode main body on the first base plate.

14. The phase shifter according to claim 7, wherein the signal line and the reference electrode are both provided on the side of one of the first base plate and the second base plate proximal to the dielectric layer, a first patch electrode layer corresponding to the straight unit and a second patch electrode layer corresponding to the bent unit are arranged on the side, which is proximal to the dielectric layer, of the other of the first base plate and the second base plate;

the first patch electrode layer comprises at least one first patch electrode arranged in one-to-one correspondence with the at least one first branch to form at least one first variable capacitor, and an orthogonal projection of each of the at least one first patch electrode on the first base plate at least partially overlaps an orthogonal projection of a corresponding one of the at least one first branch on the first base plate; and the second patch electrode layer comprises at least one second patch electrode arranged in one-to-one correspondence with the at least one second branch to form at least one second variable capacitor, and an orthogonal projection of each of the at least one second patch electrode on the first base plate at least partially overlaps an orthogonal projection of a corresponding one of the at least one second branch on the first base plate.

15. The phase shifter according to claim 7, wherein the at least one second branch comprises a plurality of second branches, and the second branches in a same spacing region are spaced apart from each other along the extending direction of the second signal line main body.

16. The phase shifter according to claim 7, wherein at least one tuning bridge is connected between the two second electrode main bodies corresponding to the bent unit, disposed in a plane different from a plane where the second signal line main body is located, and is spaced apart from each other along the extending direction of the second signal line main body.

17. The phase shifter according to claim 2, wherein at least one tuning bridge is connected between the two second electrode main bodies corresponding to the bent unit, disposed in a plane different from a plane where the second signal line main body is located, and is spaced apart from each other along the extending direction of the second signal line main body.

18. The phase shifter according to claim 17, wherein the signal line and the reference electrode are disposed on the sides of different ones of the first base plate and the second base plate proximal to the dielectric layer, respectively; and the at least one tuning bridge is disposed on the base plate where the reference electrode is disposed, and is disposed on the same surface as the two second electrode main bodies.

19. The phase shifter according to claim 17, wherein the signal line and the reference electrode are both disposed on a same side of a same one of the first base plate and the second base plate proximal to the dielectric layer; and each tuning bridge comprises two supporting portions and a crossbeam portion, the two supporting portions are arranged on the base plate where the signal line and the reference electrode are both arranged and are respectively connected to the two second electrode main bodies, the crossbeam portion is arranged in a plane different from a plane where the two second electrode main bodies are arranged, and both ends of the crossbeam portion are connected to the two supporting portions, respectively.

20. An antenna, comprising the phase shifter according to claim 1.

* * * * *